United States Patent
Okamoto (10) Patent No.: US 10,077,358 B2
(45) Date of Patent: Sep. 18, 2018

(54) ETHYLENE-VINYL ALCOHOL COPOLYMER RESIN COMPOSITION AND METHOD FOR PRODUCING SAME

(71) Applicant: KURARAY CO., LTD., Kurashiki-shi (JP)

(72) Inventor: Makoto Okamoto, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 49 days.

(21) Appl. No.: 15/115,482

(22) PCT Filed: Jan. 29, 2015

(86) PCT No.: PCT/JP2015/052429
§ 371 (c)(1),
(2) Date: Jul. 29, 2016

(87) PCT Pub. No.: WO2015/115511
PCT Pub. Date: Aug. 6, 2015

(65) Prior Publication Data
US 2017/0183493 A1  Jun. 29, 2017

(30) Foreign Application Priority Data

Jan. 31, 2014  (JP) .................... 2014-016347

(51) Int. Cl.
  *C08J 5/18* (2006.01)
  *C08L 29/04* (2006.01)
  *C08L 53/02* (2006.01)

(52) U.S. Cl.
  CPC ............. *C08L 53/025* (2013.01); *C08J 5/18* (2013.01); *C08L 29/04* (2013.01); *C08L 53/02* (2013.01)

(58) Field of Classification Search
  CPC ...... C08L 29/04; C08L 23/08; C08L 23/0846; C08L 23/0861; C08L 2205/02; C08L 2205/025; C08J 5/18; C08K 2003/324; B32B 27/08; B32B 27/306; B32B 2307/558; B32B 439/00
  See application file for complete search history.

(56) References Cited

U.S. PATENT DOCUMENTS

| | | | |
|---|---|---|---|
| 9,663,592 B2 * | 5/2017 | Okamoto | B32B 1/02 |
| 2004/0096683 A1 | 5/2004 | Ikeda et al. | |
| 2005/0032955 A1 | 2/2005 | Nakano et al. | |
| 2005/0147778 A1 | 7/2005 | Tai et al. | |
| 2007/0196679 A1 | 8/2007 | Moriyama et al. | |
| 2011/0020626 A1 | 1/2011 | Okamoto et al. | |

FOREIGN PATENT DOCUMENTS

| | | |
|---|---|---|
| EP | 1 754 727 A1 | 2/2007 |
| GB | 1 569 962 A | 6/1980 |
| JP | 43-7547 B1 | 3/1968 |
| JP | 53-99334 A | 8/1978 |
| JP | 60-173038 A | 9/1985 |
| JP | 2004-161874 A | 6/2004 |
| JP | 2005-68414 A | 3/2005 |
| JP | 2006-124668 A | 5/2006 |
| JP | 2010-260878 A | 11/2010 |
| JP | 2013-177576 A | 9/2013 |
| WO | WO-94/27805 A1 * | 12/1994 |
| WO | 02/092643 A1 | 11/2002 |
| WO | 03/072653 A1 | 9/2003 |
| WO | 2005/121194 A1 | 12/2005 |
| WO | 2014/024912 A1 | 2/2014 |

OTHER PUBLICATIONS

International Search Report dated Mar. 24, 2015 in PCT/JP2015/052429 filed Jan. 29, 2015.
U.S. Appl. No. 14/419,338, filed Feb. 3, 2015, U.S. 2015-0210788 A1, Makoto Okamoto, et al.

* cited by examiner

*Primary Examiner* — Irina S Zemel
*Assistant Examiner* — Jeffrey S Lenihan
(74) *Attorney, Agent, or Firm* — Oblon, McClelland, Maier & Neustadt, L.L.P.

(57) ABSTRACT

A resin composition comprising a modified ethylene-vinyl alcohol copolymer (A) and an unmodified ethylene-vinyl alcohol copolymer (B), wherein the modified ethylene-vinyl alcohol copolymer (A) is represented by a following formula (I), contents (mol %) of a, b, and c based on the total monomer units satisfy following formulae (1) to (3), and a degree of saponification is not less than 80 mol %, thereby providing a resin composition that is excellent in a barrier property, impact resistance, and secondary processability and moreover excellent in productivity.

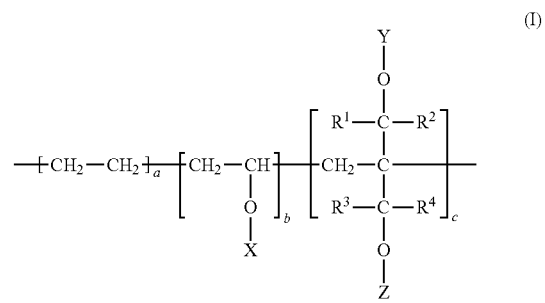

$18 \leq a \leq 55$  (1)

$0.01 \leq c \leq 20$  (2)

$[100-(a+c)] \times 0.9 \leq b \leq [100-(a+c)]$  (3).

16 Claims, 1 Drawing Sheet

ETHYLENE-VINYL ALCOHOL COPOLYMER RESIN COMPOSITION AND METHOD FOR PRODUCING SAME

TECHNICAL FIELD

The present invention relates to a resin composition containing a modified ethylene-vinyl alcohol copolymer and an unmodified ethylene-vinyl alcohol copolymer, a method of producing the same, and use of the same.

BACKGROUND ART

Ethylene-vinyl alcohol copolymers (hereinafter, may be abbreviated as EVOH) are excellent in transparency, a gas barrier property, flavor retention, solvent resistance, oil resistance, and the like, and making good use of such properties, are used for wide use including various packaging containers, such as food packaging containers, fuel containers, medical product packaging containers, industrial chemical packaging containers, and agrochemical packaging containers. For production of such molded article, EVOH is often melt molded, and after that, is secondary processed. For example, stretching in an effort to improve mechanical strength and thermoforming of a multilayer sheet including an EVOH layer to make a container shape are widely carried out.

In recent years, there are increasing demands for stretching at a higher draw ratio and obtaining a molded article in a deeper drawing shape by thermoforming. Since EVOH is a resin having a high modulus of elasticity, there are also increasing demands for a resin having greater impact resistance. From such a situation, a resin is desired that is improved in impact resistance and secondary processability without decreasing performances, such as transparency, a gas barrier property, flavor retention, solvent resistance, and oil resistance, that EVOH originally has as much as possible.

Patent Document 1 describes modified EVOH obtained by reacting a monofunctional epoxy compound with a hydroxyl group of EVOH and describes that flexibility and secondary processability of the EVOH are improved. However, since the modified EVOH is obtained by reacting an epoxy compound with EVOH in a molten state, there have been problems of increasing production steps and rising production costs. Patent Document 2 describes a resin composition, containing the modified EVOH described in Patent Document 1 and unmodified EVOH, that is capable of improving stretchability, secondary processability, and the like without severely reducing the barrier properties and the transparency of the unmodified EVOH. Patent Document 3 describes a fuel container having a layer of the resin composition according to Patent Document 2.

Patent Document 4 describes a packaging material which has a layer of a composition having a plurality of endothermic peaks in a melting curve by DSC measurement, made by blending a plurality of EVOHs having different vinyl alcohol contents, and describes that it is excellent in a gas barrier property, mechanical properties, and processability. However, in this case, it has not been easy to manage both the gas barrier property and the secondary processability at a high level and it has also been unavoidable to decrease the transparency.

Patent Document 5 describes modified EVOH that is obtained by copolymerizing ethylene, vinyl acetate, and 3,4-diacetoxy-1-butene and then saponifying it, and in which 3,4-dihydroxy-1-butene units are copolymerized, and describes that the modified EVOH is excellent in stretchability, a gas barrier property, appearance, and strength. However, since 3,4-diacetoxy-1-butene has the polymerization reactivity that is equivalent compared with vinyl acetate, most of it turns out to remain after polymerization when the copolymer is taken out at a low conversion. Therefore, loads of washing and wastewater treatment increase and a rise in production costs is also unavoidable.

PRIOR ART DOCUMENTS

Patent Documents

Patent Document 1: WO 02/092643 A1
Patent Document 2: WO 03/072653 A1
Patent Document 3: JP 2004-161874 A
Patent Document 4: JP 60-173038 A
Patent Document 5: WO 2005/121194 A1

SUMMARY OF THE INVENTION

Problems to be Solved by the Invention

The present invention has been made to solve the above problems and is to provide a resin composition, containing a modified ethylene-vinyl alcohol copolymer and an unmodified ethylene-vinyl alcohol copolymer, that is excellent in a barrier property, impact resistance, and secondary processability and moreover excellent in productivity. In addition, it is to provide preferred use of such resin composition. Further, it is to provide a preferred method of producing such resin composition.

Means of Solving the Problems

The above problems are solved by providing a resin composition comprising a modified ethylene-vinyl alcohol copolymer (A) and an unmodified ethylene-vinyl alcohol copolymer (B), wherein the modified ethylene-vinyl alcohol copolymer (A) is represented by a following formula (I), contents (mol %) of a, b, and c based on the total monomer units satisfy following formulae (1) to (3), and a degree of saponification (DS) defined by a following formula (4) is not less than 90 mol %, and the unmodified ethylene-vinyl alcohol copolymer (B) has an ethylene unit content of from 20 to 60 mol % and has a degree of saponification of not less than 80 mol %,

[In the formula (I), each of $R^1$, $R^2$, $R^3$, and $R^4$ independently denotes a hydrogen atom or an alkyl group having a carbon number of from 1 to 10, and the alkyl group may include a hydroxyl group, an alkoxy group, or a halogen atom.

Each of X, Y, and Z independently denotes a hydrogen atom, a formyl group, or an alkanoyl group having a carbon number of from 2 to 10.]

$$18 \leq a \leq 55 \quad (1)$$

$$0.01 \leq c \leq 20 \quad (2)$$

$$[100-(a+c)] \times 0.9 \leq b \leq [100-(a+c)] \quad (3)$$

$$DS = [(\text{Total Number of Moles of Hydrogen Atoms in } X, Y, \text{ and } Z)/(\text{Total Number of Moles of } X, Y, \text{ and } Z)] \times 100 \quad (4).$$

At this time, it is preferred that a weight ratio (A/B) of the modified ethylene-vinyl alcohol copolymer (A) to the unmodified ethylene-vinyl alcohol copolymer (B) is from 5/95 to 50/50. It is also preferred that $R^1$, $R^2$, $R^3$, and $R^4$ of the modified ethylene-vinyl alcohol copolymer (A) are hydrogen atoms. It is also preferred that each of X, Y, and Z of the modified ethylene-vinyl alcohol copolymer (A) is independently a hydrogen atom or an acetyl group.

In the resin composition, it is preferred that an oxygen transmission rate at 20° C. and 65% RH is not more than 100 cc·20 μm/m²·day·atm. In addition, it is also preferred that the resin composition further comprises from 10 to 500 ppm of alkali metal salt in terms of alkali metal element. A preferred embodiment of the resin composition is a barrier material.

A film or a sheet comprising a layer of the resin composition is a preferred embodiment of the present invention. At this time, it is preferred that the film or the sheet is stretched to seven times or more in an area ratio. In addition, the film or the sheet, wherein the layer of the resin composition and a layer of a thermoplastic resin other than an ethylene-vinyl alcohol copolymer are laminated, is also a preferred embodiment of the present invention. Further, a heat shrink film or a heat shrink sheet comprising the film or the sheet is also a preferred embodiment of the present invention.

A coextrusion blow molded container comprising: a layer of the resin composition; and a layer of a thermoplastic resin other than an ethylene-vinyl alcohol copolymer is also a preferred embodiment of the present invention. An extrusion molded article comprising the resin composition is also a preferred embodiment of the present invention. A thermoformed article comprising the resin composition is also a preferred embodiment of the present invention. A fuel container comprising the resin composition is also a preferred embodiment of the present invention.

The above problems are also solved by providing a method of producing the resin composition, comprising: obtaining a modified ethylene-vinyl ester copolymer represented by a following formula (IV) by radical polymerization of ethylene, vinyl ester represented by a following formula (II), and an unsaturated monomer represented by a following formula (III); followed by saponifying it to produce the modified ethylene-vinyl alcohol copolymer (A); and then mixing the modified ethylene-vinyl alcohol copolymer (A) with the unmodified ethylene-vinyl alcohol copolymer (B).

[In the formula (II), $R^5$ denotes a hydrogen atom or an alkyl group having a carbon number of from 1 to 9.]

[In the formula (III), $R^1$, $R^2$, $R^3$, and $R^4$ are same as those in the formula (I). Each of $R^6$ and $R^7$ independently denotes a hydrogen atom or an alkyl group having a carbon number of from 1 to 9]

[In the formula (IV), $R^1$, $R^2$, $R^3$, $R^4$, $R^5$, $R^6$, $R^7$, a, b, and c are same as the formulae (I) to (III)].

At this time, it is preferred that the method further comprises: contacting a resin at least one of the modified ethylene-vinyl alcohol copolymer (A) and the unmodified ethylene-vinyl alcohol copolymer (B) with an aqueous solution containing alkali metal salt; and then mixing both resins.

Effects of the Invention

The resin composition of the present invention containing the modified ethylene-vinyl alcohol copolymer and the unmodified ethylene-vinyl alcohol copolymer is excellent in a barrier property, impact resistance, and secondary processability and moreover excellent in productivity. Accordingly, it is possible to be used for various applications making good use of such properties. In addition, according to the production method of the present invention, it is possible to efficiently produce the resin composition.

MODES FOR CARRYING OUT THE INVENTION

A resin composition of the present invention comprises a modified ethylene-vinyl alcohol copolymer (A) and an unmodified ethylene-vinyl alcohol copolymer (B), wherein the modified ethylene-vinyl alcohol copolymer (A) is represented by a following formula (I), contents (mol %) of a, b, and c based on the total monomer units satisfy following formulae (1) to (3), and a degree of saponification (DS) defined by a following formula (4) is not less than 90 mol %, and the unmodified ethylene-vinyl alcohol copolymer (B) has an ethylene unit content of from 20 to 60 mol % and has a degree of saponification of not less than 80 mol %,

[In the formula (I), each of $R^1$, $R^2$, $R^3$, and $R^4$ independently denotes a hydrogen atom or an alkyl group having a carbon number of from 1 to 10, and the alkyl group may include a hydroxyl group, an alkoxy group, or a halogen atom. Each of X, Y, and Z independently denotes a hydrogen atom, a formyl group, or an alkanoyl group having a carbon number of from 2 to 10.]

$$18 \leq a \leq 55 \quad (1)$$

$$0.01 \leq c \leq 20 \quad (2)$$

$$[100-(a+c)] \times 0.9 \leq b \leq [100-(a+c)] \quad (3)$$

DS=[(Total Number of Moles of Hydrogen Atoms in X, Y, and Z)/(Total Number of Moles of X, Y, and Z)]×100 (4).

The modified EVOH (A) has, in addition to ethylene units and vinyl alcohol units, monomer units having a 1,3-diol structure in a main chain of the copolymer and thus the crystallinity decreases compared with EVOH not containing the monomer units, so that it is possible to improve impact resistance and secondary processability. In addition, since the crystallization rate also decreases compared with EVOH not containing the monomer units, it is also possible to improve the interlayer adhesion of a multilayer structure having a layer of the modified EVOH (A). Further, with this modified EVOH (A), since the 1,3-diol structure has strong hydrogen bonding strength, it is possible to reduce decrease in barrier property caused by decrease in crystallinity. Further, as described later, it is possible to produce this modified EVOH (A) at low cost.

The resin composition of the present invention is mainly characterized in containing the modified EVOH (A) and the unmodified EVOH (B), thereby enabling improvement in impact resistance and secondary processability while holding the reduction in barrier performance to a minimum.

In the formula (I), each of $R^1$, $R^2$, $R^3$, and $R^4$ independently denotes a hydrogen atom or an alkyl group having a carbon number of from 1 to 10. $R^1$, $R^2$, $R^3$, and $R^4$ may be same groups and may also be different. The structure of the alkyl group is not particularly limited and may have a branched structure and a cyclic structure in part. In addition, the alkyl group may include a hydroxyl group, an alkoxy group, or a halogen atom. $R^1$, $R^2$, $R^3$, and $R^4$ are preferably a hydrogen atom or an alkyl group having a carbon number of from 1 to 5, and more preferably a hydrogen atom. A preferred example of the alkyl group may include a linear or branched alkyl group, such as a methyl group, an ethyl group, an n-propyl group, an isopropyl group, an n-butyl group, an isobutyl group, a tert-butyl group, and a pentyl group.

In the formula (I), each of X, Y, and Z independently denotes a hydrogen atom, a formyl group, or an alkanoyl group having a carbon number of from 2 to 10. The formula (I) has a hydroxyl group in a case that X, Y, or Z is a hydrogen atom, and the formula (I) has an ester group in a case that X, Y, or Z is a formyl group or an alkanoyl group. The alkanoyl group is preferably an alkanoyl group having a carbon number of from 2 to 5 and preferably exemplified by an acetyl group, a propanoyl group, a butanoyl group, and the like. Among them, an acetyl group is particularly preferred. It is preferred that all of X, Y, and Z are a hydrogen atom or a mixture containing a hydrogen atom.

Monomer units containing X is usually obtained by saponifying vinyl ester. Accordingly, it is preferred that X is a mixture of a hydrogen atom with a formyl group or an alkanoyl group having a carbon number of from 2 to 10. Considering availability of the monomer (vinyl acetate) and production costs, it is particularly preferred that X is a mixture of a hydrogen atom with an acetyl group.

Meanwhile, it is possible to produce monomer units containing Y and Z by copolymerizing unsaturated monomer units having a 1,3-diester structure and then saponifying it and it is also possible to produce them by directly copolymerizing unsaturated monomer units having a 1,3-diol structure. Accordingly, both Y and Z may be a hydrogen atom only, and may also be a mixture of a hydrogen atom with a formyl group or an alkanoyl group having a carbon number of from 2 to 10, more preferably a mixture of a hydrogen atom with an acetyl group.

In the modified EVOH (A) of the present invention, contents (mol %) of a, b, and c based on the total monomer units satisfy following formulae (1) to (3).

$$18 \leq a \leq 55 \quad (1)$$

$$0.01 \leq c \leq 20 \quad (2)$$

$$[100-(a+c)] \times 0.9 \leq b \leq [100-(a+c)] \quad (3)$$

The character a denotes a content (mol %) of ethylene units based on the total monomer units, which is from 18 to 55 mol %. When the ethylene unit content is less than 18 mol %, melt moldability of the resin composition of the present invention deteriorates. The character a is preferably not less than 22 mol %. In contrast, when the ethylene unit content is more than 55 mol %, a barrier property of the resin composition of the present invention becomes insufficient. The character a is preferably not more than 50 mol %.

The character c denotes a content (mol %) of monomer units containing Y and Z shown at the right edge of the formula (I) based on the total monomer units, which is from 0.01 to 20 mol %. When c is less than 0.01 mol %, impact resistance and secondary processability of the resin composition of the present invention become insufficient. The character c is preferably not less than 0.1 mol % and more preferably not less than 0.5 mol %. In contrast, when c is more than 20 mol %, crystallinity of the modified EVOH (A) extremely decreases and thus a barrier property of the resin composition of the present invention decreases. The character c is preferably not more than 10 mol % and more preferably not more than 5 mol %.

The character b denotes a content (mol %) of vinyl alcohol units and vinyl ester units based on the total monomer units. This satisfies the following formula (3).

$$[100-(a+c)] \times 0.9 \leq b \leq [100-(a+c)] \quad (3)$$

That is, in the modified EVOH (A), not less than 90% of the monomer units other than the ethylene units and the monomer units containing Y and Z shown at the right edge of the formula (I) is vinyl alcohol units or vinyl ester units. In a case that the formula (3) is not satisfied, the gas barrier property of the resin composition of the present invention becomes insufficient. The following formula (3') is satisfied preferably and the following formula (3") is satisfied more preferably.

$$[100-(a+c)] \times 0.95 \leq b \leq [100-(a+c)] \quad (3')$$

$$[100-(a+c)] \times 0.98 \leq b \leq [100-(a+c)] \quad (3")$$

The modified EVOH (A) has a degree of saponification (DS) defined by the following formula (4) is not less than 90 mol %.

DS=[(Total Number of Moles of Hydrogen Atoms in $X, Y,$ and $Z$)/(Total Number of Moles of $X, Y,$ and $Z$)]×100    (4)

Here, the "total number of moles of hydrogen atoms in X, Y, and Z" shows a number of moles of the hydroxyl group, and the "total number of moles of X, Y, and Z" shows a total number of moles of the hydroxyl group and the ester group. When the degree of saponification (DS) becomes less than 90 mol %, a sufficient barrier performance is not obtained in the resin composition of the present invention and moreover thermal stability becomes insufficient and gels and hard spots are easily generated during thermoforming. The degree of saponification (DS) is preferably not less than 95 mol %, more preferably not less than 98 mol %, and even more preferably not less than 99 mol %.

It is possible to obtain the degree of saponification (DS) of the modified EVOH (A) by nuclear magnetic resonance (NMR). It is also possible to obtain the contents of the monomer units represented by a, b, and c above by NMR. In addition, the modified EVOH (A) is usually a random copolymer. It is possible to confirm to be a random copolymer from NMR and results of melting point measurement.

A preferred melt flow rate (MFR) (at 190° C. under a load of 2160 g) of the modified EVOH (A) is from 0.1 to 30 g/10 min., more preferably from 0.3 to 25 g/10 min., and even more preferably from 0.5 to 20 g/10 min. It is noted that, when the melting point is about 190° C. or over 190° C., the measurements are carried out under a load of 2160 g at two or more temperatures not lower than the melting point. The results are plotted, in a semilog graph, with reciprocals of absolute temperatures as abscissa against logarithms of MFRs as ordinate and the preferable MFR is represented by an extrapolation to 190° C.

Here, in a case that the modified EVOH (A) is made of a mixture of two or more different kinds of modified EVOH (A), average values calculated from a blend weight ratio are used for the contents of the monomer units represented by a, b, and c, the degrees of saponification, and the MFR.

The method of producing the modified EVOH (A) is not particularly limited. For example, it may include a method, comprising: obtaining a modified ethylene-vinyl ester copolymer represented by a following formula (IV) by radical polymerization of ethylene, vinyl ester represented by a following formula (II), and an unsaturated monomer represented by a following formula (III); and then saponifying it.

In the formula (II), $R^5$ denotes a hydrogen atom or an alkyl group having a carbon number of from 1 to 9. A carbon number of the alkyl group is preferably from 1 to 4. Vinyl ester represented by the formula (II) is exemplified by vinyl formate, vinyl acetate, vinyl propionate, vinyl butyrate, vinyl isobutyrate, vinyl pivalate, vinyl versatate, vinyl caproate, and the like. In an economic perspective, vinyl acetate is particularly preferred.

In the formula (III), $R^1$, $R^2$, $R^3$, and $R^4$ are same as those in the formula (I). Each of $R^6$ and $R^7$ independently denotes a hydrogen atom or an alkyl group having a carbon number of from 1 to 9. A carbon number of the alkyl group is preferably from 1 to 4. The unsaturated monomer represented by the formula (III) may include 2-methylene-1,3-propanediol diacetate (1,3-diacetoxy-2-methylenepropane), 2-methylene-1,3-propanediol dipropionate, 2-methylene-1,3-propanediol dibutyrate, and the like. Among all, 2-methylene-1,3-propanediol diacetate is preferably used in view of easy production. In a case of 2-methylene-1,3-propanediol diacetate, $R^1$, $R^2$, $R^3$, and $R^4$ are hydrogen atoms and $R^6$ and $R^7$ are methyl groups.

In the formula (IV), $R^1$, $R^2$, $R^3$, $R^4$, $R^5$, $R^6$, $R^7$, a, b, and c are same as those in the formulae (I) through (III). The modified ethylene-vinyl ester copolymer thus obtained is subjected to saponification treatment after that.

In addition, instead of the unsaturated monomer represented by the above formula (III), an unsaturated monomer represented by the following formula (V) may also be copolymerized, and in this case, only the units derived from the unsaturated monomer represented by the above formula (II) are saponified by the saponification treatment.

(V)

In the formula (V), $R^1$, $R^2$, $R^3$, and $R^4$ are same as those in the formula (I). The unsaturated monomer represented by the formula (V) may include 2-methylene-1,3-propanediol.

The unsaturated monomers represented by the formula (III) and the formula (V) used in the present invention have high copolymerization reactivity with vinyl ester monomers, so that copolymerization reaction proceeds easily. Accordingly, it is easy to increase an amount of modification and a degree of polymerization of the modified ethylene-vinyl ester copolymer thus obtained. In addition, an amount of the unreacted unsaturated monomers remaining after polymerization is less even when the polymerization reaction is stopped at a low conversion, so that it is excellent in respect of environment and cost. The unsaturated monomers represented by the formula (III) and the formula (V) are more excellent at this point than other monomers, such as allyl glycidyl ether and 3,4-diacetoxy-1-butene, having a functional group in an allylic position and having only one carbon atom. Here, the unsaturated monomer represented by the formula (III) has higher reactivity than the unsaturated monomer represented by the formula (V).

The mode of polymerization for production of a modified ethylene-vinyl ester copolymer by copolymerizing ethylene, vinyl ester represented by the above formula (II), and the unsaturated monomer represented by the above formula (III) or (V) may be any of batch polymerization, semi-batch polymerization, continuous polymerization, and semi-continuous polymerization. In addition, as the method of polymerization, it is possible to employ a known method, such as a bulk polymerization method, a solution polymerization method, a suspension polymerization method, and an emulsion polymerization method. A bulk polymerization method or a solution polymerization method is usually employed, in which polymerization proceeds without solvent or in a solvent, such as alcohol. In a case of obtaining a modified ethylene-vinyl ester copolymer with a high degree of polymerization, employment of an emulsion polymerization method becomes an option.

Although a solvent used in a solution polymerization method is not particularly limited, alcohol is used preferably, and lower alcohol, such as methanol, ethanol, and propanol, for example, are more preferably used. A used amount of solvent in a polymerization reaction liquid may be selected considering the intended viscosity average degree of polymerization of the modified EVOH (A) and chain transfer of the solvent, and a weight ratio of the solvent to the total monomers contained in the reaction liquid (solvent/total monomers) is selected from a range of from 0.01 to 10, preferably a range of from 0.05 to 3.

A polymerization initiator used for copolymerization of ethylene, vinyl ester represented by the above formula (II), and the unsaturated monomer represented by the above formula (III) or (V) is selected in accordance with the method of polymerization from known polymerization initiators, for example, an azo initiator, a peroxide initiator, and a redox initiator. The azo initiator may include, for example, 2,2'-azobisisobutyronitrile, 2,2'-azobis (2,4-dimethylvaleronitrile), and 2,2'-azobis (4-methoxy-2,4-dimethylvaleronitrile). The peroxide initiator may include, for example, percarbonate compounds, such as diisopropyl peroxydicarbonate, di-2-ethylhexyl peroxydicarbonate, and diethoxyethyl peroxydicarbonate; perester compounds, such as t-butylperoxy neodecanoate, α-cumylperoxy neodecanoate, and acetyl peroxide; acetylcyclohexylsulfonyl peroxide; 2,4,4-trimethylpentyl-2-peroxyphenoxyacetate; and the like. Potassium persulfate, ammonium persulfate, hydrogen peroxide, and the like may also be used in combination with the above initiators. The redox initiator is a polymerization initiator in which, for example, the above peroxide initiators and a reducing agent, such as sodium hydrogen sulfite, sodium hydrogen carbonate, tartaric acid, L-ascorbic acid, and rongalite, are combined. An amount of polymerization initiator used is different depending on the polymerization catalyst and thus is not determined unconditionally, and it is adjusted in accordance with the polymerization rate. The amount of polymerization initiator used based on vinyl ester monomers is preferably from 0.01 to 0.2 mol % and more preferably from 0.02 to 0.15 mol %. Although the polymerization temperature is not particularly limited, it is appropriately from room temperature to 150° C. approximately, and preferably not less than 40° C. and not more than a boiling point of a solvent to be used.

For copolymerization of ethylene, vinyl ester represented by the above formula (II), and the unsaturated monomer represented by the above formula (III) or (V), they may be copolymerized in the presence of a chain transfer agent as long as the effects of the present invention are not inhibited. The chain transfer agent may include, for example, aldehydes, such as acetaldehyde and propionaldehyde; ketones, such as acetone and methylethylketone; mercaptans, such as 2-hydroxyethanethiol; and phosphinates, such as sodium phosphinate monohydrate. Among all, aldehydes and ketones are used preferably. Although an amount of adding the chain transfer agent to the polymerization reaction liquid is determined in accordance with the chain transfer constant of the chain transfer agent and the intended degree of polymerization of the modified ethylene-vinyl ester copolymer, it is preferably from 0.1 to 10 parts by mass based on 100 parts by mass of the vinyl ester monomer in general.

It is possible to obtain the modified EVOH (A) used in the present invention by saponifying the modified ethylene-vinyl ester copolymer thus obtained. At this time, the vinyl ester units in the copolymer are converted to vinyl alcohol units. In addition, ester bonds derived from the unsaturated monomer represented by the formula (III) are also hydrolyzed at the same time to be converted to a 1,3-diol structure. In such a manner, it is possible to hydrolyze different kinds of ester group by one saponification reaction at the same time.

It is possible to employ a known method for a method of saponifying the modified ethylene-vinyl ester copolymer. The saponification reaction is usually carried out in an alcohol or hydrous alcohol solution. Alcohol preferably used at this time is lower alcohol, such as methanol and ethanol, and particularly preferably methanol. Alcohol or hydrous alcohol used for the saponification reaction may contain another solvent, as long as the solvent is not more than 40 weight % of its weight, such as acetone, methyl acetate, ethyl acetate, and benzene. The catalyst used for the saponification is, for example, alkali metal hydroxides, such as potassium hydroxide and sodium hydroxide; alkali catalysts, such as sodium methylate; and acid catalysts, such as mineral acid. Although the temperature to carry out the saponification is not limited, it is preferably in a range of from 20° C. to 120° C. In a case that gel-like products precipitate as the saponification proceeds, it is possible to obtain modified EVOH (A) by grinding the products and then washing and drying them.

The modified EVOH (A) used in the present invention may contain a structural unit derived from another ethylenic unsaturated monomer that is copolymerizable with ethylene, vinyl ester represented by the above formula (II), and the unsaturated monomer represented by the above formula (III) or (V) as long as the effects of the present invention are not inhibited. Such ethylenic unsaturated monomer may include, for example, α-olefins, such as propylene, n-butene, isobutylene, and 1-hexene; acrylic acid and salts thereof; unsaturated monomers containing an acrylic ester group; methacrylic acid and salts thereof; unsaturated monomers containing a methacrylic ester group; acrylamide, N-methylacrylamide, N-ethylacrylamide, N,N-dimethylacrylamide, diacetoneacrylamide, acrylamide propane sulfonic acid and salts thereof, and acrylamidopropyl dimethylamine and salts thereof (for example, quaternary salts); methacrylamide, N-methylmethacrylamide, N-ethylmethacrylamide, methacrylamide propane sulfonic acid and salts thereof, and methacrylamidopropyl dimethylamine and salts thereof (for example, quaternary salts); vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, and 2,3-diacetoxy-1-vinyloxypropane; vinyl cyanides, such as acrylonitrile and methacrylonitrile; vinyl halides, such as vinyl chloride and vinyl fluoride; vinylidene halides, such as vinylidene chloride and vinylidene fluoride; allyl compounds, such as allyl acetate, 2,3-diacetoxy-1-allyloxypropane, and allyl chloride; unsaturated dicarboxylic acids, such as maleic acid, itaconic acid, and fumaric acid, and salts thereof or esters thereof; vinylsilane compounds, such as vinyltrimethoxysilane; and isopropenyl acetates.

In the resin composition of the present invention, unmodified EVOH (B) is blended with the modified EVOH (A) obtained as described above. Here, the unmodified EVOH (B) used in the present invention means EVOH not containing monomer units containing Y and Z shown at the right edge of the formula (I) (structural units derived from the unsaturated monomers represented by the above formula (III) or (V)), and general purpose EVOH that is widely used conventionally can be used for it.

The unmodified EVOH (B) has an ethylene unit content of from 20 to 60 mol %. When the ethylene unit content is less than 20 mol %, melt moldability of the resin composition of the present invention deteriorates. The ethylene unit content is preferably not less than 22 mol % and more preferably not less than 24 mol %. In contrast, when the ethylene unit content is more than 60 mol %, a barrier property of the resin composition of the present invention becomes insufficient. The ethylene unit content is preferably not more than 55 mol % and more preferably not more than 50 mol %.

The unmodified EVOH (B) has a degree of saponification of not less than 80 mol %. The degree of saponification is a ratio of saponified vinyl ester units to the copolymerized vinyl ester units. When the degree of saponification is less than 80 mol %, the gas barrier property of the resin composition of the present invention becomes insufficient. The degree of saponification is preferably not less than 95 mol % and more preferably not less than 99 mol %.

The unmodified EVOH (B) may contain, as long as the effects of the present invention are not inhibited, a small amount of structural units derived from another ethylenic unsaturated monomer that are copolymerizable with ethylene, vinyl ester represented by the above formula (II), and an unsaturated monomer represented by the above formula (III) or (V). For such another ethylenic unsaturated monomer, those exemplified in the description of the modified EVOH (A) may be used. The content of structural units derived from another ethylenic unsaturated monomer is usually not more than 10% of the total monomer units, preferably not more than 5%, and more preferably not more than 2%. It is even more preferred not to substantially contain structural units derived from another ethylenic unsaturated monomer.

A preferred melt flow rate (MFR) (at 190° C. under a load of 2160 g) of the unmodified EVOH (B) is from 0.1 to 30 g/10 min., more preferably from 0.3 to 25 g/10 min., and even more preferably from 0.5 to 20 g/10 min. It is noted that, when the melting point is about 190° C. or over 190° C., the measurements are carried out under a load of 2160 g at two or more temperatures not lower than the melting point. The results are plotted, in a semilog graph, with reciprocals of absolute temperatures as abscissa against logarithms of MFRs as ordinate and the MFR is represented by an extrapolation to 190° C.

In the resin composition of the present invention, it is preferred that a weight ratio (NB) of the modified EVOH (A) to the unmodified EVOH (B) is from 5/95 to 50/50. When the weight ratio (A/B) is less than 5/95, there is a risk that impact resistance and secondary processability of the resin composition become insufficient. The weight ratio (NB) is more preferably not less than 8/92. In contrast, when the weight ratio (A/B) is more than 50/50, there is a risk that a barrier property of the resin composition becomes insufficient. The weight ratio (NB) is more preferably not more than 40/60.

The resin composition of the present invention may contain other additives in addition to the modified EVOH (A) and the unmodified EVOH (B). For example, it is possible to blend thermoplastic resins other than EVOH, plasticizers, lubricants, stabilizers, surfactants, colorants, ultraviolet absorbers, antistatic agents, desiccants, cross-linkers, metal salts, fillers, various fibers, and the like.

Among all, it is preferred that the resin composition of the present invention contains alkali metal salt. By containing alkali metal salt, interlayer adhesion when laminated to a resin other than EVOH becomes good. Although cationic species of the alkali metal salt is not particularly limited, it is preferably sodium salt or potassium salt. Anionic species of the alkali metal salt is also not particularly limited. It is possible to add as salt of carboxylic acid, salt of carbonic acid, salt of hydrogen carbonic acid, salt of phosphoric acid, salt of hydrogen phosphoric acid, salt of boric acid, hydroxide, and the like. It is preferred that an alkali metal salt content in the resin composition of the present invention is from 10 to 500 ppm in terms of alkali metal element. The interlayer adhesion may be insufficient in a case that the alkali metal salt content is less than 10 ppm, and it is more preferably not less than 50 ppm. In contrast, the melt stability may be insufficient in a case that the alkali metal salt content is more than 500 ppm, and it is more preferably not more than 300 ppm.

It is also preferred that the resin composition of the present invention contains a phosphoric acid compound. By containing a phosphoric acid compound in such a manner, it is possible to prevent coloration during melt molding. The phosphoric acid compound used for the present invention is not particularly limited, and it is possible to use various acids, such as phosphoric acid and phosphorous acid, and salts thereof. Although the phosphate may be contained in any form of primary phosphate, secondary phosphate, and tertiary phosphate, primary phosphate is preferred. Although its cationic species is also not particularly limited, alkali metal salt is preferred. Among them, sodium dihydrogen phosphate and potassium dihydrogen phosphate are preferred. It is preferred that the phosphoric acid compound content in the resin composition of the present invention is preferably from 5 to 200 ppm in terms of phosphate radicals. The coloration resistance during melt molding may be insufficient in a case that the phosphoric acid compound content is less than 5 ppm. In contrast, the melt stability may be insufficient in a case that the phosphoric acid compound content is more than 200 ppm, and it is more preferably not more than 160 ppm.

The resin composition of the present invention may contain a boron compound. By containing a boron compound in such a manner, it is possible to suppress torque variation during melting by heating. The boron compound used for the present invention is not particularly limited and may include boric acids, borates, salts of boric acids, boron hydrides, and the like. Specifically, the boric acids may include orthoboric acid, metaboric acid, tetraboric acid, and the like; the borates may include triethyl borate, trimethyl borate, and the like; the salts of boric acids may include alkali metal salts, alkaline earth metal salts of various boric acids mentioned above, borax, and the like. Among these compounds, orthoboric acid (hereinafter, may be described simply as boric acid) is preferred. It is preferred that the boron compound content in the resin composition of the present invention is preferably from 20 to not more than 2000 ppm in terms of boron element. The suppression of torque variation during melting by heating may become insufficient in a case that the boron compound content is less than 20 ppm, and it is more preferably not less than 50 ppm. In contrast, in a case that the boron compound content is more than 2000 ppm, gelation easily occurs and the moldability may deteriorate, and it is more preferably not more than 1000 ppm.

In the resin composition of the present invention, it is preferred that an oxygen transmission rate at 20° C. and 65% RH is not more than 100 cc·20 µm/m²·day·atm. The oxygen transmission rate is more preferably not more than 10 cc·20 µm/m²·day·atm and even more preferably not more than 5 cc·20 µm/m²·day·atm.

A method of producing the resin composition of the present invention is not particularly limited. It is preferred to produce the modified EVOH (A) and then to mix it with the unmodified EVOH (B). Although the mixing method is not particularly limited, they are usually mixed in a molten state. The melt mixing method is not particularly limited and it is possible to use an extruder, an intensive mixer, a Banbury mixer, a kneader, or the like. At this time, the various additives mentioned above may be added and kneaded at the same time.

When alkali metal salt, a phosphoric acid compound, or a boron compound is blended with the resin composition of the present invention, a method is preferred that comprises: contacting a resin at least one of the modified EVOH (A) and the unmodified EVOH (B) with an aqueous solution containing alkali metal salt, a phosphoric acid compound, or a boron compound; and then mixing both resins. In this case, it is also possible to contact either one of the modified EVOH (A) and the unmodified EVOH (B) with an aqueous solution containing such component and then mixing it with the other resin not containing such component. However, in order to obtain a stable effect of addition, it is preferred to contact both resins with the aqueous solution and then to mix both resins.

A method of molding the resin composition of the present invention is not particularly limited. Although it is possible to mold it using a solution of the resin composition, melt molding is preferred. A melt molding method is exemplified by methods, such as extrusion molding, injection molding, inflation molding, press molding, and blow molding. Among all, extrusion molding is a preferred molding method, which enables various extrusion molded articles to be obtained.

A preferred embodiment of the resin composition of the present invention is a barrier material. The resin composition of the present invention is excellent in a barrier property to, other than gases such as oxygen, fuels such as gasoline and to various chemicals.

By melt molding the resin composition of the present invention, various molded products, such as films, sheets, containers, pipes, and fibers, are obtained. Among all, films and sheets having a layer of the resin composition of the present invention requires flexibility and are often made by stretching process after melt molding, so that they are suitable applications to use. Here, the films and the sheets may be monolayer products of the resin composition of the present invention or may be multilayer structures including other thermoplastic resin layers.

A molded article of the resin composition of the present invention is used as, in many cases, a multilayer structure in which the layer of the resin composition and a layer of a thermoplastic resin other than EVOH are laminated. Here, a thermoplastic resin other than EVOH means a thermoplastic resin other than EVOH in a wide concept including the modified EVOH (A) and the unmodified EVOH (B). In particular, layer constitution is preferred in which a layer of the resin composition of the present invention is an intermediate layer and other thermoplastic resins are arranged in outer layers on its both sides. It is also preferred that the resin composition layer and the other thermoplastic resin layers are adhered via an adhesive resin layer. The layer of the resin composition of the present invention is in charge of a barrier property, and it has a thickness of usually from 3 to 250 µm and preferably from 10 to 100 µm. Meanwhile, the thermoplastic resin used for the outer layers is not particularly restricted and is selected appropriately considering required performances, such as moisture permeability, thermal resistance, a heat sealing property, and transparency, and applications. Although a thickness of the entire multilayer structure is not particularly limited, it is usually from 15 to 6000 µm. Preferred embodiments of such multilayer structure may include a multilayer film or a multilayer sheet, a coextrusion blow molded container, a coinjection blow molded container, and the like.

The other thermoplastic resin layers used for a layer laminated to the layer of the resin composition of the present invention is exemplified by polyolefins, such as polyethylene, polypropylene, ethylene-vinyl acetate copolymers, and ethylene-(meth)acrylic ester copolymers; polyamide; polyester; polystyrene; polyvinyl chloride; acrylic resins; polyvinylidene chloride; polyacetal; polycarbonate; and the like.

It is possible to obtain the multilayer structure in various production methods, and it is possible to employ coextrusion, dry lamination, sandwich lamination, extrusion lamination, coextrusion lamination, solution coating, and the like. Among them, coextrusion is a method in which the resin composition of the present invention and another thermoplastic resin are extruded at the same time from an extruder and laminated in a molten state to be discharged in the form of multilayer film from the die exit. In a case of forming a film by coextrusion, a method is preferred in which a layer of the resin composition of the present invention and the other thermoplastic resin layers are laminated by sandwiching the adhesive resin layers. As the adhesive resin, it is preferred to use polyolefin containing a carboxyl group, a carboxylic anhydride group, or an epoxy group. Such adhesive resin is excellent in adhesion to the resin composition of the present invention and also adhesion to the other thermoplastic resins not containing a carboxyl group, a carboxylic anhydride group, or an epoxy group.

Polyolefin containing a carboxyl group may include polyolefins having copolymerized acrylic acid and methacrylic acid and the like. At this time, as represented by ionomers, all or part of carboxyl groups contained in polyolefin may be present in the form of metal salt. Polyolefin containing a carboxylic anhydride group may include polyolefins that are graft modified with maleic anhydride and itaconic acid. In addition, the polyolefin-based resin containing an epoxy group may include polyolefins having copolymerized glycidyl methacrylate. Among the polyolefin containing a carboxyl group, a carboxylic anhydride group, or an epoxy group, polyolefins modified with carboxylic anhydride, such as maleic anhydride, particularly polyethylene and polypropylene modified with carboxylic anhydride are preferred in view of excellent adhesion.

It is preferred that the melt molded article thus obtained is subjected further to secondary processing. Molded articles containing the resin composition of the present invention is excellent in secondary processability. A method of secondary processing is exemplified by uniaxial stretching, biaxial stretching, stretch blow molding, thermoforming, rolling and the like. In particular, a film or a sheet stretched at a high ratio is a preferred embodiment of the present invention. Specifically, a film or a sheet stretched to seven times or more in an area ratio is a particularly preferred embodiment. In addition, a thermoformed article is also a preferred embodiment of the present invention. Prior to secondary processing, crosslinking by radiation exposure and the like may be applied. Still in addition, a heat shrink film or a heat shrink sheet is also a preferred embodiment of the present invention. It can be produced by remaining, without relaxation, residual stress in the film or the sheet stretched as above. The melt molded article subjected to secondary processing may be a monolayer product of the resin composition of the present invention or may be a multilayer structure including other thermoplastic resin layers.

The molded article of the present invention thus obtained is excellent in a barrier property, impact resistance, and secondary processability, so that it is molded in various shapes, such as a film, a cup, and a bottle and it is possible to be preferably used as various containers and the like. Among all, a useful application is a fuel container. The resin composition of the present invention is suitable for a fuel container because it is excellent in impact resistance and secondary processability and also is excellent in a fuel barrier property. As such fuel container, a coextrusion blow molded container and a thermoformed container are preferred.

EXAMPLES

Although further detailed descriptions are given below to the present invention by Examples, the present invention is not limited to Examples.

Synthesis Example 1

(1) Synthesis of Modified Ethylene-Vinyl Alcohol Copolymer (Modified EVAc)

To a 50 L pressure reaction vessel provided with a jacket, a stirrer, a nitrogen inlet, an ethylene inlet, and an initiator addition port, 21 kg of vinyl acetate ($R^5$ is a methyl group in the formula (II): hereinafter, referred to as VAc), 2.1 kg of methanol (hereinafter, may be referred to as MeOH), and 1.1 kg of 2-methylene-1,3-propanediol diacetate ($R^1$, $R^2$, $R^3$, and $R^4$ are hydrogen atoms and $R^6$ and $R^7$ are methyl groups in the formula (III): a compound identical to 1,3-diacetoxy-2-methylenepropane: hereinafter, referred to as MPDAc) were charged, and the temperature was raised to 60° C., and after that, nitrogen bubbling was carried out for 30 minutes to purge inside the reaction vessel with nitrogen. Subsequently, ethylene was introduced to have a reaction vessel pressure (ethylene pressure) of 4.2 MPa. After the temperature in the reaction vessel was adjusted at 60° C., 16.8 g of 2,2'-azobis(2,4-dimethylvaleronitrile) ("V-65" produced by Wako Pure Chemical Industries, Ltd.) as an initiator was added in the form of methanol solution to initiate polymerization. During the polymerization, the ethylene pressure was maintained at 4.2 MPa and the polymerization temperature at 60° C. After 4.5 hours, when the conversion of VAc became 34%, the polymerization was stopped by cooling. After removing ethylene by opening the reaction vessel, a nitrogen gas was bubbled to completely remove ethylene. Subsequently, after unreacted VAc was removed under reduced pressure, MeOH was added to the modified ethylene-vinyl acetate copolymer (herein, may be referred to as modified EVAc) to which a structural unit derived from MPDAc was introduced by copolymerization to have a 20 mass % MeOH solution.

(2) Saponification of Modified EVAc

To a 10 L reaction vessel provided with a jacket, a stirrer, a nitrogen inlet, a reflux condenser, and a solution addition port, 4715 g of a 20 mass % MeOH solution of the modified EVAc obtained in (1) was charged. The temperature was raised to 60° C. while blowing nitrogen into the solution, and a MeOH solution having a sodium hydroxide concentration of 2 N was added for two hours at a rate of 14.7 mL/min. After completion of adding the MeOH sodium hydroxide solution, saponification reaction proceeded by stirring for two hours while keeping the temperature in the system at 60° C. After that, 254 g of acetic acid was added to stop the saponification reaction. After that, while heating and stirring at 80° C., 3 L of ion exchange water was added to drain MeOH outside the reaction vessel and to precipitate modified ethylene-vinyl alcohol copolymer (hereinafter, referred to as modified EVOH). The precipitated modified EVOH was collected by decantation and ground with a mixer. The modified EVOH powder thus obtained was added in a 1 g/L aqueous acetic acid solution (bath ratio of 20:proportion of 1 kg of the powder to 20 L of the aqueous solution) and it was stirred and washed for two hours. It was dewatered and was further casted in a 1 g/L aqueous acetic acid solution (bath ratio of 20) and it was stirred and washed for two hours. An operation of casting one obtained by dewatering it in ion exchange water (bath ratio of 20) for stirring and washing for two hours and dewatering it was repeated three times to carry out refinement. Subsequently, it was stirred and immersed in 10 L of an aqueous solution containing 0.5 g/L of acetic acid and 0.1 g/L of sodium acetate for four hours and then dewatered, and it was dried at 60° C. for 16 hours to obtain 503 g of roughly dried modified EVOH.

(3) Production of Modified EVOH Hydrous Pellet

To a 3 L stirring vessel provided with a jacket, a stirrer, and a reflux condenser, 758 g of the roughly dried modified EVOH obtained by repeating (2) twice, 398 g of water, and 739 g of MeOH were charged and the temperature was raised to 85° C. for dissolution. The solution was extruded in a liquid mixture of water/MeOH=90/10 cooled at 5° C. through a glass tube having a diameter of 4 mm to be precipitated in the form of strand, and the strand was cut with a strand cutter into pellets to obtain modified EVOH hydrous pellets. The water content of the modified EVOH hydrous pellets thus obtained was measured by a halogen moisture meter "HR 73" manufactured by Mettler and it was 55 mass %.

(4) Production of Modified EVOH Composition Pellet

In a 1 g/L aqueous acetic acid solution (bath ratio of 20), 1577 g of the modified EVOH hydrous pellets obtained in (3) above was added and it was stirred and washed for two hours. It was dewatered and was further added in a 1 g/L aqueous acetic acid solution (bath ratio of 20) and it was stirred and washed for two hours. After dewatering, the aqueous acetic acid solution was renewed and same operation was carried out. An operation of casting one, obtained by washing with the aqueous acetic acid solution and then dewatering it, in ion exchange water (bath ratio of 20) for stirring and washing for two hours and dewatering it was repeated three times to carry out purification, and thus modified EVOH hydrous pellets from which the catalyst residue during the saponification reaction was removed were obtained. The hydrous pellets were added in an aqueous solution (bath ratio of 20) having a concentration of sodium acetate of 0.525 g/L, an acetic acid concentration of 0.8 g/L, and a phosphoric acid concentration of 0.007 g/L for immersion for four hours while periodically stirred. They were dewatered and dried at 80° C. for three hours and at 105° C. for 16 hours, thereby obtaining modified EVOH composition pellets containing acetic acid, sodium salt, and a phosphoric acid compound.

(5) Content of Each Structural Unit in Modified EVAc

In the modified EVAc, the content of ethylene units (a mol % in the formula (IV)), the content of structural units derived from vinyl acetate (b mol % in the formula (IV)), and the content of structural units derived from MPDAc (c mol % in the formula (IV)) were calculated by $^1$H-NMR measurement of the modified EVAc before saponification.

Firstly, a small amount of the MeOH solution of modified EVAc obtained in (1) was sampled and modified EVAc was precipitated in ion exchange water. The precipitate was collected and dried at 60° C. under vacuum, and thus dried modified EVAc was obtained. Next, the dried modified EVAc thus obtained was dissolved in dimethyl sulfoxide (DMSO)-$d_6$ containing tetramethylsilane as the internal standard material and measured at 80° C. using 500 MHz$^1$H-NMR ("GX-500" manufactured by JEOL Ltd.).

Figure 1:
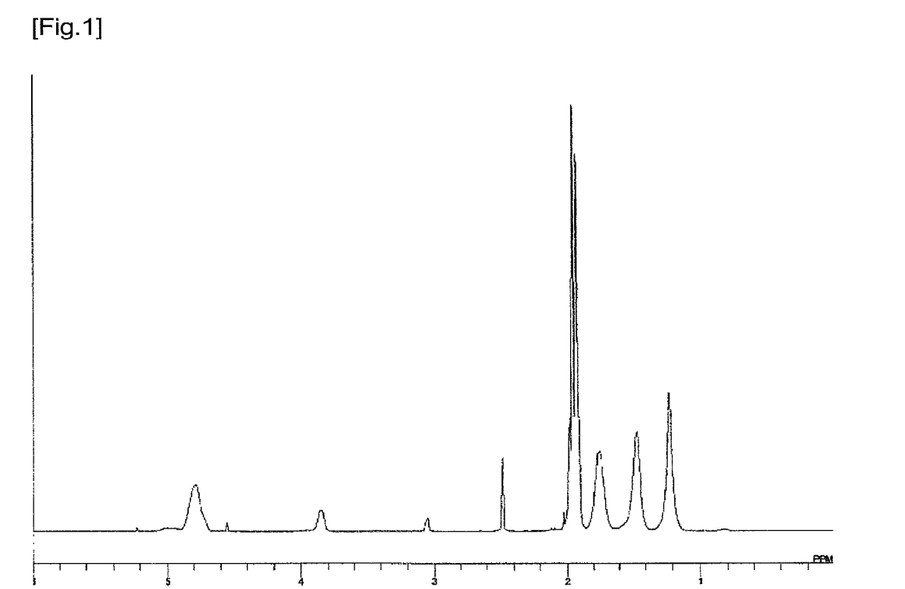
FIG. 1 is a ¹H-NMR spectrum of a modified EVAc obtained in Synthesis Example 1.

FIG. 1 illustrates a $^1$H-NMR spectrum of a modified EVAc obtained in Synthesis Example 1. Each peak in the spectrum is assigned as follows:

from 0.6 to 1.0 ppm:methylene proton (4H) of ethylene unit in a terminal region;
from 1.0 to 1.85 ppm:methylene proton (4H) of ethylene unit in an intermediate region, methylene proton (2H) in main chain of structural unit derived from MPDAc, methylene proton (2H) of vinyl acetate unit;
from 1.85 to 2.1 ppm:methyl proton (6H) of structural unit derived from MPDAc and methyl proton (3H) of vinyl acetate unit;
from 2.4 to 2.6 ppm:DMSO
from 3.7 to 4.1 ppm:methylene proton (4H) in side chain of structural unit derived from MPDAc;
from 4.4 to 5.3 ppm:methine proton (1H) of vinyl acetate unit.

In accordance with the above assignment, where the integral value of from 0.6 to 1.0 ppm is x, the integral value of from 1.0 to 1.85 ppm is y, the integral value of from 3.7 to 4.1 ppm is z, and the integral value of from 4.4 to 5.3 ppm is w, the ethylene unit content (a:mol %), the vinyl ester unit content (b: mol %), and the content of structural units derived from MPDAc (c:mol %) are calculated according to the following formulae, respectively.

$$a=[(2x+2y-z-4w)/(2x+2y+z+4w)]\times 100$$

$$b=[8w/(2x+2y+z+4w)]\times 100$$

$$c=[2z/(2x+2y+z+4w)]\times 100$$

As a result of calculating in the above method, the ethylene unit content (a) was 32.0 mol %, the vinyl ester unit content (b) was 64.1 mol %, the content (c) of structural units derived from MPDAc was 3.9 mol %. The values of a, b, and c in the modified EVAc were same as the values of a, b, and c in the modified EVOH after saponification treatment.

(6) Degree of Saponification of Modified EVOH

Figure 2:
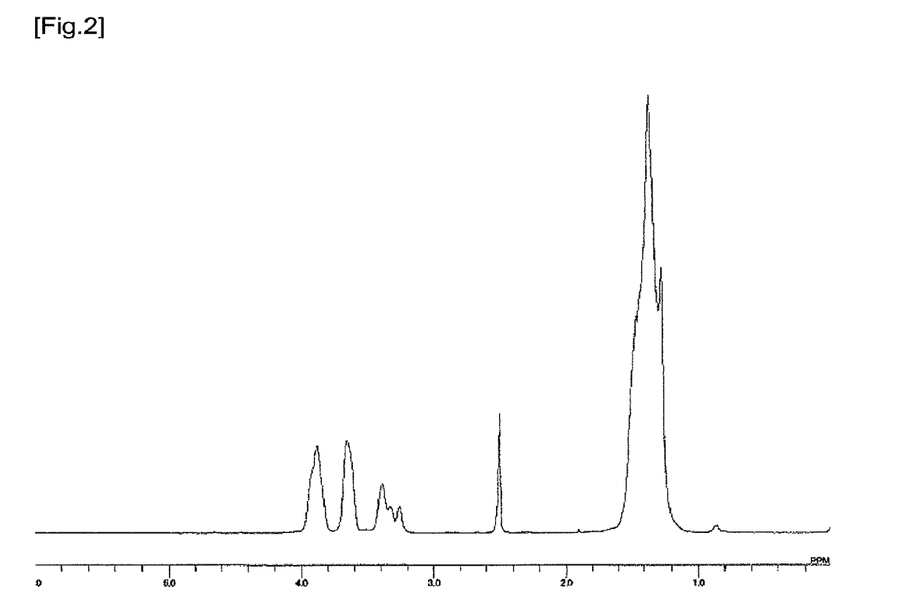
FIG. 2 is a ¹H-NMR spectrum of a modified EVOH obtained in Synthesis Example 1.

The modified EVOH after saponification was also subjected to $^1$H-NMR measurement similarly. The roughly dried modified EVOH obtained in (2) above was dissolved in dimethyl sulfoxide (DMSO)-$d_6$ containing tetramethylsilane as the internal standard material and tetrafluoroacetic acid (TFA) as an additive and measured at 80° C. using 500 MHz$^1$H-NMR ("GX-500" manufactured by JEOL Ltd.). FIG. 2 illustrates a $^1$H-NMR spectrum of a modified EVOH obtained in Synthesis Example 1. Since the peak intensity of from 1.85 to 2.1 ppm decreased drastically, it is clear that the ester group contained in the structural units derived from MPDAc, in addition to the ester group contained in vinyl acetate, was also saponified to be hydroxyl group. The degree of saponification was calculated from the peak intensity ratio of the methyl proton of vinyl acetate unit (from 1.85 to 2.1 ppm) and the methine proton of vinyl alcohol unit (from 3.15 to 4.15 ppm). The degree of saponification of modified EVOH was not less than 99.9 mol %.

(7) Melting Point of Modified EVOH

Measurement of the modified EVOH composition pellets obtained in (4) above was performed according to JIS K7121 by raising the temperature from 30° C. to 215° C. at a rate of 10° C./min., and after that, rapidly cooling it to −35° C. at 100° C./min., and again from −35° C. to 195° C. at a rate of temperature rise of 10° C./min. (differential scanning calorimeter (DSC) "RDC220/SSC5200H" manufactured by Seiko Instruments & Electronics Ltd.). For temperature calibration, indium and lead were used. The peak melting temperature (Tpm) was obtained from the 2nd-run chart in accordance with the JIS above to define it as the melting point of modified EVOH. The melting point was 151° C.

(8) Sodium Salt Content and Phosphoric Acid Compound Content in Modified EVOH Composition In a teflon (registered trademark) pressure vessel, 0.5 g of the modified EVOH composition pellets obtained in (4)

above was placed and 5 mL of concentrated nitric acid was added there for decomposition at room temperature for 30 minutes. After 30 minutes, the lid was closed for decomposition by heating at 150° C. for ten minutes and subsequently at 180° C. for five minutes with a wet digestion apparatus ("MWS-2" manufactured by Actac Corp.), and after that, it was cooled to room temperature. The process liquid was poured into a 50 mL measuring flask and diluted with pure water. With this solution, analysis of contained metal was carried out by an ICP emission spectrophotometer ("OPTIMA4300DV" manufactured by Perkin-Elmer Inc.) and the contents of sodium elements and phosphorus elements were obtained. The sodium salt content was 150 ppm in terms of sodium elements, and the phosphoric acid compound content was 10 ppm in terms of phosphate radicals.

Synthesis Example 2

Polymerization was carried out in the method same as Synthesis Example 1 (1) other than changing the amount of MeOH to 6.3 kg, changing the ethylene pressure to 3.7 MPa, changing the amount of initiator to 4.2 g, and not charging the MPDAc. After four hours, when the conversion of VAc became 44%, the polymerization was stopped by cooling. Subsequently, by the same process as Synthesis Example 1, unmodified EVOH composition pellets containing 135 ppm of sodium salt in terms of sodium elements and 11 ppm of a phosphoric acid compound in terms of phosphate radicals were produced. Results of evaluation in the same manner as Synthesis Example 1 are collectively indicated in Table 1.

Synthesis Example 3

Polymerization was carried out in the method same as Synthesis Example 1 (1) other than changing the amount of initiator to 8.4 g and changing the amount of charged MPDAc to 0.5 kg. After six hours, when the conversion of VAc became 52%, the polymerization was stopped by cooling. Subsequently, modified EVOH composition pellets were produced and evaluations were performed in the same manner as Synthesis Example 1, and the results are collectively indicated in Table 1.

Synthesis Example 4

Modified EVAc was synthesized in the same manner as Synthesis Example 3 to obtain a methanol solution of modified EVAc. Subsequently, saponification treatment was carried out in the method same as Synthesis Example 1 (2) other than adding an MeOH solution of sodium hydroxide at a rate of 3.7 mL/min. Subsequently, modified EVOH composition pellets were produced and evaluations were performed in the same manner as Synthesis Example 1, and the results are collectively indicated in Table 1.

Synthesis Example 5

Polymerization was carried out in the method same as Synthesis Example 1 (1) other than changing the amount of MeOH to 1.1 kg, changing the ethylene pressure to 3.8 MPa, changing the amount of charged MPDAc to 2.0 kg, and additionally adding 16.8 g of the initiator five hours after the polymerization was initiated. After ten hours, when the conversion of VAc became 9%, the polymerization was stopped by cooling. Subsequently, modified EVOH composition pellets were produced and evaluations were performed in the same manner as Synthesis Example 1, and the results are collectively indicated in Table 1.

Synthesis Example 6

Polymerization was carried out in the method same as Synthesis Example 1 (1) other than changing the amount of MeOH to 1.1 kg, changing the amount of initiator to 16.8 g, changing the ethylene pressure to 6.0 MPa, and changing the amount of charged MPDAc to 1.1 kg. After four hours, when the conversion of VAc became 22%, the polymerization was stopped by cooling. Subsequently, modified EVOH composition pellets were produced and evaluations were performed in the same manner as Synthesis Example 1, and the results are collectively indicated in Table 1.

Synthesis Example 7

Polymerization was carried out in the method same as Synthesis Example 1 (1) other than changing the amount of MeOH to 6.3 kg, changing the amount of initiator to 4.2 g, changing the ethylene pressure to 2.9 MPa, and not adding MPDAc. After four hours, when the conversion of VAc became 50%, the polymerization was stopped by cooling. Subsequently, unmodified EVOH composition pellets were produced and evaluations were performed in the same manner as Synthesis Example 1, and the results are collectively indicated in Table 1.

Synthesis Example 8

Polymerization was carried out in the method same as Synthesis Example 1 (1) other than changing the amount of MeOH to 4.2 kg, changing the amount of initiator to 4.2 g, changing the ethylene pressure to 5.3 MPa, and not adding MPDAc. After three hours, when the conversion of VAc became 29.3%, the polymerization was stopped by cooling. Subsequently, unmodified EVOH composition pellets were produced and evaluations were performed in the same manner as Synthesis Example 1, and the results are collectively indicated in Table 1.

Synthesis Example 9

Polymerization was carried out in the method same as Synthesis Example 1 (1) other than changing the amount of MeOH to 2.5 kg, changing the amount of initiator to 8.4 g, changing the ethylene pressure to 3.4 MPa, and changing the amount of charged MPDAc to 0.77 kg. After four hours, when the conversion of VAc became 32%, the polymerization was stopped by cooling. Subsequently, modified EVOH composition pellets were produced and evaluations were performed in the same manner as Synthesis Example 1, and the results are collectively indicated in Table 1.

Example 1

(1) Preparation of Film

After five parts by weight of the modified EVOH composition pellets obtained in Synthesis Example 1 and 95 parts by weight of the unmodified EVOH composition pellets obtained in Synthesis Example 2 are dry blended, they were melt kneaded by a twin screw extruder and then pelletized. Using the pellets thus obtained, monolayer film formation was carried out with a 20 mm extruder "D2020" (D (mm)=20, L/D=20, compression ratio=2.0, screw:full flight) manufactured by Toyo Seiki Seisaku-Sho, Ltd. in the conditions below to obtain a monolayer film of the EVOH composition.

Cylinder temperature: supply area at 175° C., compression area at 220° C., measurement area at 220° C.
Die temperature: 220° C.
Screw rotation speed: from 40 to 100 rpm
Amount of discharge: from 0.4 to 1.5 kg/hour
Drawing roll temperature: 80° C.
Drawing roll speed: from 0.8 to 3.2 m/min.
Film thickness: from 20 to 150 μm In other Examples herein, in accordance with the melting point of EVOH composition, temperature conditions of the extruder for preparation of a monolayer film were set as follows. Here, when the EVOH composition contains two kinds of EVOH, the cylinder temperature and the die temperature were set on the basis of the melting point of the EVOH having a higher melting point.

Cylinder Temperature:
Feed section: 175° C.
Compression section: melting point of EVOH composition+30 to 45° C.
Metering section: melting point of EVOH composition+30 to 45° C.
Die temperature: melting point of EVOH composition+30 to 45° C.

(2) Stretch Test

The monolayer film having a thickness of 150 μm obtained in (1) above was put in a pantograph type biaxial stretching machine manufactured by Toyo Seiki Seisaku-Sho, Ltd. It was subjected to simultaneous biaxial stretching at 80° C. at a draw ratio of from 2×2 time to 4×4 time to obtain a heat shrink film. The greatest draw ratio at which the film was able to be stretched without being broken was defined as a maximum draw ratio. The maximum draw ratio was three times (nine times in area ratio). In addition, evaluation of a heat shrink film obtained by stretching at a draw ratio of 3×3 time in accordance with the criteria below was determined as B. The results are indicated in Table 2.

A: No stretching unevenness and no local thickness deviation were found and the appearance was good.

B: Stretching unevenness or local thickness deviation occurred.

C: Stretching unevenness or local thickness deviation occurred.

Alternatively, breakage occurred in the film.

(3) Shrinkage Test

The heat shrink film at a draw ratio of 3×3 time obtained in (2) above was cut into 10 cm×10 cm and immersed in hot water at 80° C. for ten seconds to calculate a shrinkage ratio (%) as below. The shrinkage ratio was 65.5%. Results are indicated in Table 2.

Shrinkage ratio (%)={$(S-s)/S$}×100

S: area of film before shrinkage
s: area of film after shrinkage (4) Measurement of Oxygen Transmission Rate The monolayer film having a thickness of 20 μm obtained in (1) above was moisture conditioned in the conditions at 20° C. and 85% RH for three days, and after that, measurement ("OX-TORAN MODEL 2/21" manufactured by MOCON, Inc.) of the oxygen transmission rate was carried out in the same conditions. As a result, the oxygen transmission rate (OTR) was 1.4 cc·20 μm/m²·day·atm. Results are indicated in Table 2.

Example 2

A monolayer film was prepared and evaluated in the same method other than, in Example 1 (1), using 10 parts by weight of the modified EVOH composition pellets and 90 parts by weight of the unmodified EVOH composition pellets. Results are collectively indicated in Table 2.

Example 3

A monolayer film was prepared and evaluated in the same method other than, in Example 1 (1), using 30 parts by weight of the modified EVOH composition pellets and 70 parts by weight of the unmodified EVOH composition pellets. Results are collectively indicated in Table 2.

Example 4

A monolayer film was prepared and evaluated in the same method other than, in Example 1 (1), using 45 parts by weight of the modified EVOH composition pellets and 55 parts by weight of the unmodified EVOH composition pellets. Results are collectively indicated in Table 2.

Example 5

A monolayer film was prepared and evaluated in the same method other than, in Example 1 (1), using 70 parts by weight of the modified EVOH composition pellets and 30 parts by weight of the unmodified EVOH composition pellets. Results are collectively indicated in Table 2.

Example 6

A monolayer film was prepared and evaluated in the same method other than, in Example 1 (1), using the modified EVOH composition pellets obtained in Synthesis Example 3, instead of the modified EVOH composition pellets obtained in Synthesis Example 1, and using 30 parts by weight of the modified EVOH composition pellets and 70 parts by weight of the unmodified EVOH composition pellets. Results are collectively indicated in Table 2.

Example 7

A monolayer film was prepared and evaluated in the same method other than, in Example 1 (1), using the modified EVOH composition pellets obtained in Synthesis Example 4, instead of the modified EVOH composition pellets obtained in Synthesis Example 1, and using 30 parts by weight of the modified EVOH composition pellets and 70 parts by weight of the unmodified EVOH composition pellets. Results are collectively indicated in Table 2.

Example 8

A monolayer film was prepared and evaluated in the same method other than, in Example 1 (1), using the modified EVOH composition pellets obtained in Synthesis Example 5, instead of the modified EVOH composition pellets obtained in Synthesis Example 1, and using 30 parts by weight of the modified EVOH composition pellets and 70 parts by weight of the unmodified EVOH composition pellets. Results are collectively indicated in Table 2.

Example 9

A monolayer film was prepared and evaluated in the same method other than, in Example 1 (1), using the modified EVOH composition pellets obtained in Synthesis Example 6, instead of the modified EVOH composition pellets obtained in Synthesis Example 1, and using 30 parts by weight of the modified EVOH composition pellets and 70 parts by weight of the unmodified EVOH composition pellets. Results are collectively indicated in Table 2.

Example 10

A monolayer film was prepared and evaluated in the same method other than, in Example 1 (1), using the unmodified EVOH composition pellets obtained in Synthesis Example 7, instead of the unmodified EVOH composition pellets obtained in Synthesis Example 2, and using 30 parts by weight of the modified EVOH composition pellets and 70 parts by weight of the unmodified EVOH composition pellets. Results are collectively indicated in Table 2.

Example 11

A monolayer film was prepared and evaluated in the same method other than, in Example 1 (1), using the unmodified EVOH composition pellets obtained in Synthesis Example 8, instead of the unmodified EVOH composition pellets obtained in Synthesis Example 2, and using 30 parts by weight of the modified EVOH composition pellets and 70 parts by weight of the unmodified EVOH composition pellets. Results are collectively indicated in Table 2.

Comparative Example 1

A monolayer film was prepared and evaluated in the same method other than, in Example 1 (1), using only the unmodified EVOH composition and not carrying out the dry blending with the modified EVOH and the melt kneading. Results are collectively indicated in Table 1. It was found that the monolayer film only of the unmodified EVOH was poor in the stretchability.

Comparative Example 2

A monolayer film was prepared and evaluated in the same method other than, in Comparative Example 1, using the pellets obtained in Synthesis Example 7 instead of the unmodified EVOH composition obtained in Synthesis Example 2. Results are collectively indicated in Table 2. It was found that the monolayer film only of the unmodified EVOH was poor in the stretchability.

Comparative Example 3

A monolayer film was prepared and evaluated in the same method other than, in Comparative Example 1, using the pellets obtained in Synthesis Example 8 instead of the unmodified EVOH composition obtained in Synthesis Example 2. Results are collectively indicated in Table 2. It was found that the monolayer film only of the unmodified EVOH was poor in the stretchability.

Comparative Example 4

A monolayer film was prepared and evaluated in the same method other than, in Comparative Example 1, using the modified EVOH composition pellets obtained in Synthesis Example 1 instead of the unmodified EVOH composition obtained in Synthesis Example 2. Results are collectively indicated in Table 2. It was found that the monolayer film only of the modified EVOH was poor in the oxygen barrier property.

Comparative Example 5

A monolayer film was prepared and evaluated in the same method other than, in Comparative Example 1, using the modified EVOH composition pellets obtained in Synthesis Example 3 instead of the unmodified EVOH composition obtained in Synthesis Example 2. Results are collectively indicated in Table 2. It was found that the monolayer film only of the modified EVOH was poor in the oxygen barrier property.

Example 12

(5) Preparation of Blow Molded Container

Ten parts by weight of the modified EVOH composition pellets obtained in Synthesis Example 9 and 90 parts by weight of the unmodified EVOH composition pellets obtained in Synthesis Example 2 were dry blended, and after that, they were melt kneaded by a twin screw extruder and then pelletized to obtain resin composition pellets. Meanwhile, as high density polyethylene (HDPE), "HZ8200B" (MFR at 190° C. under a load of 2160 g=0.01 g/10 min.) produced by Mitsui Chemicals, Inc. was used and, as an adhesive resin, "Admer GT4" (MFR at 190° C. under a load of 2160 g=0.2 g/10 min.) produced by Mitsui Chemicals, Inc. was used. A three-material five-layer parison having a layer constitution, HDPE/adhesive resin/resin composition/adhesive resin/HDPE, was extruded by use of a blow molding machine TB-ST-6P manufactured by Suzuki Seikosho, Co., Ltd. while setting extrusion temperature for each resin and die temperature to 210° C. The parison was blown in a mold at 15° C. and cooled for 20 seconds, yielding a 500-mL multilayer container. The container had an average thickness of 2175 μm in the body part and the thickness of each layer was (inside) HDPE/adhesive resin/resin composition/adhesive resin/HDPE (outside)=1000/50/75/50/1000 μm. The container was able to be molded without any particular problems. In addition, the container had a good appearance.

(6) Evaluation of Fuel Barrier Property

In the multilayer container obtained in (5) above, 300 ml of model gasoline {mixture of a ratio of toluene (45 weight %):isooctane (45 weight %):methanol (10 weight %)} was poured and completely sealed using an aluminum foil not to leak, then left in an atmosphere at 40° C. and 65% RH to obtain an amount of decrease in the bottle weight (average value of n=6) after 14 days. The amount of decrease in weight was 0.41 g. Results of evaluation are indicated in Table 3.

(7) Measurement of Breaking Height

In the multilayer container obtained in (5) above, ethylene glycol was filled 60% relative to the internal volume and left in a freezer at −40° C. for three days, and after that, dropped on the concrete to obtain a dropping height to break the bottle (leak ethylene glycol inside the container). For the breaking height, a 50% breaking height was obtained using a test result of n=30 in a method shown in JIS test methods (K7211 in "8. Calculation"). The breaking height was 6.5 m. Results of evaluation are indicated in Table 3.

(8) Preparation of Multilayer Sheet

A multilayer sheet (HDPE/adhesive resin/resin composition/adhesive resin/HDPE) was prepared by use of a three-material five-layer coextrusion machine using the pellets, prepared in (5) above, containing the modified EVOH and the unmodified EVOH. The layer constitution of the sheet included 450 μm of the HDPE resin ("HZ8200B" produced by Mitsui Chemicals, Inc.) of the inner and outer layers, 50

µm each of the adhesive resin ("Admer GT4" produced by Mitsui Chemicals, Inc.), and 75 µm of the resin composition of the intermediate layer.

(9) Preparation of Thermoformed Container

A thermoformed container was obtained by thermoforming the multilayer sheet obtained in (8) above by use of a thermoforming machine (a vacuum-pressure deep drawing molding machine, model "FX-0431-3" manufactured by Asano Laboratories Co., Ltd.) into a shape of a round cup (mold shape: upper part 75 mmφ, lower part 60 mmφ, depth 75 mm, drawn ratio S=1.0) at a sheet temperature of 160° C. using compressed air (pressure: 5 kgf/cm²). The molding conditions are as follows.
Temperature of heater: 400° C.
Plug: 45φ×65 mm
Temperature of plug: 150° C.
Temperature of mold: 70° C.

The thermoformed container thus obtained was a cup-shaped container having an internal volume of approximately 150 ml, and around a bottom portion of the cup-shaped container was cut to measure the thickness of the intermediate layer of the modified EVOH composition at a bottom corner of the cup by cross-section observation with an optical microscope (average value of n=5). The thickness of the intermediate layer at the cup corner was 29 µm. Results of evaluation are indicated in Table 3.

(10) Evaluation of Thermoformed Container

In the thermoformed container obtained in (9) above, 140 ml of model gasoline {mixture of a ratio of toluene (45 weight %):isooctane (45 weight %):methanol (10 weight %)} was poured and, after placing one cut the coextrusion sheet obtained in (8) above in a circle shape on a cup top, molded by hot plate welding in a state of completely putting the lid not to leak the contents to obtain a cup-shaped container having the model gasoline enclosed therein. It was left in an atmosphere at 40° C. and 65% RH to obtain an amount of decrease in the cup weight (average value of n=6) after 14 days. The amount of decrease in weight was 0.32 g. Results of evaluation are indicated in Table 3.

(11) Evaluation of Impact Resistance

Using the pellets, prepared in (5) above, containing the modified EVOH and the unmodified EVOH, an injected piece was prepared by use of an injection molding machine (FS-80S manufactured by Nissei Ltd.) to obtain impact strength using an Izod tester in a condition at room temperature according to JIS K7110. Ten injected pieces were measured and an average value of the measurement results was defined as the impact strength. The impact strength was 24 kJ/m². Results of evaluation are indicated in Table 3.

Comparative Example 6

A blow molded container, a thermoformed container, and injection pieces were prepared in the same method other than, in Example 12, using only the unmodified EVOH composition pellets prepared in Synthesis Example 2 for evaluation. Results are collectively indicated in Table 3. It was found that a container only of the unmodified EVOH was poor in the impact resistance and the secondary processability.

Comparative Example 7

A blow molded container, a thermoformed container, and injection pieces were prepared in the same method other than, in Example 12, using only the modified EVOH composition pellets prepared in Synthesis Example 9 for evaluation. Results are collectively indicated in Table 3. It was found that a container only of the modified EVOH was poor in the fuel barrier property.

TABLE 1

|  | Ethylene Content mol % | MPDAc Content mol % | Degree of Saponification mol % | Melting Point ° C. |
|---|---|---|---|---|
| Synthesis Example 1 | 32 | 3.9 | ≥99.9 | 151 |
| Synthesis Example 2 | 32 | 0 | ≥99.9 | 183 |
| Synthesis Example 3 | 32 | 1.4 | ≥99.9 | 173 |
| Synthesis Example 4 | 32 | 1.4 | 98.9 | 168 |
| Synthesis Example 5 | 27 | 8.0 | ≥99.9 | 125 |
| Synthesis Example 6 | 44 | 3.0 | ≥99.9 | 134 |
| Synthesis Example 7 | 27 | 0 | ≥99.9 | 191 |
| Synthesis Example 8 | 44 | 0 | ≥99.9 | 165 |
| Synthesis Example 9 | 27 | 3.0 | ≥99.9 | 166 |

TABLE 2

|  | Modified EVOH (A) | | | | Unmodified EVOH (B) | | | Film Evaluation | | | | |
|---|---|---|---|---|---|---|---|---|---|---|---|---|
|  | Blended Amount parts by weight | Ethylene Content mol % | MPDA Content mol % | Degree of Saponification mol % | Blended Amount parts by weight | Ethylene Content mol % | Degree of Saponification mol % | Maximum Draw Ratio times | Area Ratio times | Stretch- ability | Shrink- age Ratio % | Oxygen Trans- mission Rate *1) |
| Example 1 | 5 | 32 | 3.9 | ≥99.9 | 95 | 32 | ≥99.9 | 3.00 | 9.00 | B | 65.5 | 1.4 |
| Example 2 | 10 | 32 | 3.9 | ≥99.9 | 90 | 32 | ≥99.9 | 3.00 | 9.00 | A | 68.2 | 1.4 |
| Example 3 | 30 | 32 | 3.9 | ≥99.9 | 70 | 32 | ≥99.9 | 3.25 | 10.56 | A | 70.1 | 1.8 |
| Example 4 | 45 | 32 | 3.9 | ≥99.9 | 55 | 32 | ≥99.9 | 3.25 | 10.56 | A | 71.9 | 2.0 |
| Example 5 | 70 | 32 | 3.9 | ≥99.9 | 30 | 32 | ≥99.9 | 3.50 | 12.25 | A | 71.7 | 2.7 |
| Example 6 | 30 | 32 | 1.4 | ≥99.9 | 70 | 32 | ≥99.9 | 3.00 | 9.00 | A | 70.8 | 1.9 |
| Example 7 | 30 | 32 | 1.4 | 98.9 | 70 | 32 | ≥99.9 | 3.25 | 10.56 | A | 70.4 | 1.9 |
| Example 8 | 30 | 27 | 8.0 | ≥99.9 | 70 | 32 | ≥99.9 | 3.50 | 12.25 | A | 71.8 | 2.1 |
| Example 9 | 30 | 44 | 3.0 | ≥99.9 | 70 | 32 | ≥99.9 | 3.50 | 12.25 | A | 69.1 | 2.0 |
| Example 10 | 30 | 32 | 3.9 | ≥99.9 | 70 | 27 | ≥99.9 | 3.00 | 9.00 | A | 69.9 | 1.5 |
| Example 11 | 30 | 32 | 3.9 | ≥99.9 | 70 | 44 | ≥99.9 | 3.50 | 12.25 | A | 74.2 | 4.0 |
| Comparative Example 1 | 0 | — | — | — | 100 | 32 | ≥99.9 | 2.00 | 4.00 | C | — | 1.3 |
| Comparative Example 2 | 0 | — | — | — | 100 | 27 | ≥99.9 | *2) | *2) | C | — | 1.2 |

TABLE 2-continued

|  | Modified EVOH (A) | | | | Unmodified EVOH (B) | | | Film Evaluation | | | | |
|---|---|---|---|---|---|---|---|---|---|---|---|---|
|  | Blended Amount parts by weight | Ethylene Content mol % | MPDA Content mol % | Degree of Saponification mol % | Blended Amount parts by weight | Ethylene Content mol % | Degree of Saponification mol % | Maximum Draw Ratio times | Area Ratio times | Stretchability | Shrinkage Ratio % | Oxygen Transmission Rate *1) |
| Comparative Example 3 | 0 | — | — | — | 100 | 44 | ≥99.9 | 2.50 | 6.25 | C | — | 3.8 |
| Comparative Example 4 | 100 | 32 | 3.9 | ≥99.9 | 0 | — | — | 4.00 | 16.00 | A | 85.3 | 4.5 |
| Comparative Example 5 | 100 | 32 | 1.4 | ≥99.9 | 0 | — | — | 3.50 | 12.25 | A | 82.3 | 7.2 |

*1) cc · 20 μm/m² · day · atm
*2) Broken in stretch test of 2 × 2 time.

TABLE 3

|  | Modified EVOH (A) | | | | Unmodified EVOH (B) | | | Blow Molded Container | | Thermoformed Container | | Injection Molded Article |
|---|---|---|---|---|---|---|---|---|---|---|---|---|
|  | Blended Amount parts by weight | Ethylene Content mol % | MPDA Content mol % | Degree of Saponification mol % | Blended Amount parts by weight | Ethylene Content mol % | Degree of Saponification mol % | Amount of Decrease in Bottle Weight g | 50% Braking Height m | Thickness of Corner in Intermediate Layer μm | Amount of Decrease in Cup Weight g | Izod Impact Strength kJ/m² |
| Example 12 | 10 | 27 | 3.0 | ≥99.9 | 90 | 32 | ≥99.9 | 0.41 | 6.5 | 29 | 0.32 | 24 |
| Comparative Example 6 | 0 | — | — | — | 100 | 32 | ≥99.9 | 0.40 | 4.2 | 12 | 0.40 | 22 |
| Comparative Example 7 | 100 | 27 | 3.0 | ≥99.9 | 0 | — | — | 0.45 | 7.2 | 30 | 0.35 | 30 |

The invention claimed is:

1. A resin composition, comprising:
(A) a modified ethylene-vinyl alcohol copolymer (A); and
(B) an unmodified ethylene-vinyl alcohol copolymer (B),
wherein
the modified ethylene-vinyl alcohol copolymer (A) has the following formula (I):

(I)

contents in mol % of a, b, and c, based on the total monomer units, satisfy following formulae (1) to (3):

$18 \leq a \leq 55$ (1), $0.01 \leq c \leq 20$ (2), and $[100-(a+c)] \times 0.9 \leq b \leq [100-(a+c)]$ (3);

a degree of saponification (DS) defined by the following formula (4) is not less than 90 mol %:

$DS = [(\text{Total Number of Moles of Hydrogen Atoms in } X, Y, \text{ and } Z)/(\text{Total Number of Moles of } X, Y, \text{ and } Z)] \times 100$ (4);

the unmodified ethylene-vinyl alcohol copolymer (B) has an ethylene unit content of from 20 to 60 mol % and has a degree of saponification of not less than 80 mol %;

each of $R^1$, $R^2$, $R^3$, and $R^4$ independently is a hydrogen atom or an alkyl group having a carbon number of from 1 to 10, and the alkyl group optionally contains a hydroxyl group, an alkoxy group, or a halogen atom; and each of X, Y, and Z independently is a hydrogen atom, a formyl group, or an alkanoyl group having a carbon number of from 2 to 10, and wherein a weight ratio (A/B) of the modified ethylene-vinyl alcohol copolymer (A) to the unmodified ethylene-vinyl alcohol copolymer (B) is from 5/95 to 50/50.

2. The resin composition according to claim 1, wherein $R^1$, $R^2$, $R^3$, and $R^4$ of the modified ethylene-vinyl alcohol copolymer (A) are hydrogen atoms.

3. The resin composition according to claim 1, wherein each of X, Y, and Z of the modified ethylene-vinyl alcohol copolymer (A) is independently a hydrogen atom or an acetyl group.

4. The resin composition according to claim 1, wherein an oxygen transmission rate at 20° C. and 65% RH is not more than 100 cc·20 μm/m²·day·atm.

5. The resin composition according to claim 1, further comprising from 10 to 500 ppm of an alkali metal salt in terms of an alkali metal element.

6. A barrier material, comprising the resin composition according to claim 1.

7. A film or a sheet, comprising a layer of the resin composition according to claim 1.

8. The film or the sheet according to claim 7, wherein the film or the sheet is stretched to seven times or more in an area ratio.

9. The film or the sheet according to claim 7, wherein the layer of the resin composition and a layer of a thermoplastic resin other than an ethylene-vinyl alcohol copolymer are laminated.

10. A heat shrink film or a heat shrink sheet, comprising the film or the sheet according to claim 7.

11. A coextrusion blow molded container, comprising:
a layer of the resin composition according to claim 1; and
a layer of a thermoplastic resin other than an ethylene-vinyl alcohol copolymer.

12. An extrusion molded article, comprising the resin composition according to claim 1.

13. A thermoformed article, comprising the resin composition according to claim 1.

14. A fuel container, comprising the resin composition according to claim 1.

15. A method of producing the resin composition according to claim 1, the method comprising:
obtaining a modified ethylene-vinyl ester copolymer having the following formula (IV) by radical polymerization of ethylene, vinyl ester having the following formula (II), and an unsaturated monomer having the following formula (III):

followed by saponifying the modified ethylene-vinyl ester copolymer to produce the modified ethylene-vinyl alcohol copolymer (A); and then mixing the modified ethylene-vinyl alcohol copolymer (A) with the unmodified ethylene-vinyl alcohol copolymer (B), wherein:

$R^5$ is a hydrogen atom or an alkyl group having a carbon number of from 1 to 9;

$R^1$, $R^2$, $R^3$, and $R^4$ are same as those in the formula (I);

each of $R^6$ and $R^7$ independently is a hydrogen atom or an alkyl group having a carbon number of from 1 to 9; and $R^1$, $R^2$, $R^3$, $R^4$, $R^5$, $R^6$, $R^7$, a, b, and c are same as the formulae (I) to (III).

16. The method of producing the resin composition according to claim 15, further comprising:

contacting a resin comprising at least one of the modified ethylene-vinyl alcohol copolymer (A) and the unmodified ethylene-vinyl alcohol copolymer (B) with an aqueous solution containing an alkali metal salt; and then mixing both resins.

\* \* \* \* \*